United States Patent [19]
Ashton

[11] 3,992,602
[45] Nov. 16, 1976

[54] RESISTANCE WELDING APPARATUS AND METHOD

[75] Inventor: Richard F. Ashton, Richmond, Va.

[73] Assignee: Reynolds Metals Company, Richmond, Va.

[22] Filed: Sept. 2, 1975

[21] Appl. No.: 609,779

[52] U.S. Cl. .................................. 219/91; 219/78; 219/86; 219/98; 219/99; 219/111; 219/118
[51] Int. Cl.² .......................................... B23K 11/10
[58] Field of Search .................. 219/69 C, 69 V, 78, 219/86, 91, 98, 99, 111, 118

[56] References Cited
UNITED STATES PATENTS

| | | | |
|---|---|---|---|
| 2,273,819 | 2/1942 | Cooke et al. | 219/69 V |
| 3,278,720 | 10/1966 | Dixon | 219/118 |
| 3,313,909 | 4/1967 | Matthews | 219/86 |
| 3,487,195 | 12/1969 | Denis et al. | 219/111 X |
| 3,505,495 | 4/1970 | Mitchell | 219/99 |
| 3,732,392 | 5/1973 | Verner | 219/69 C |
| 3,778,583 | 12/1973 | Becker | 219/91 |

*Primary Examiner*—J. V. Truhe
*Assistant Examiner*—N.D. Herkamp
*Attorney, Agent, or Firm*—Glenn, Lyne, Gibbs & Clark

[57] ABSTRACT

In combination with conventional apparatus for joining members of aluminum or other electrically conducting material by resistance welding, adjustable supports for arranging the work-contacting electrodes in spaced proximity to the work, and circuitry for inducing an inert gas shielded arc of alternating current across each electrode and the work, the apparatus being operable to effect self-cleaning of the electrodes as well as the work between successive welding operations.

13 Claims, 5 Drawing Figures

RESISTANCE WELDING APPARATUS AND METHOD

BACKGROUND

This invention relates to resistance welding and, more particularly, to that area of the art wherein two work-contacting electrodes are utilized, including such various forms as spot welding, seam, stitch and roller welding, and projection welding.

In resistance welding generally, the faying surfaces of the electrically conducting members to be joined are superimposed under pressure. The fusion or coalescence of these surfaces is accomplished by flowing an electric current through a circuit of which the work is a part. In the form of resistance welding of specific concern herein, electrical contact with the work is made, and the loading thereof is typically provided, by means of two opposed electrodes.

As is well appreciated in the art, substantial problems are often encountered on account of surface contamination of the work. Such is especially the case where the work is of an aluminous material, the same typically being quite prone to oxidation on exposure.

Where the outer exposed surfaces of the work are oxidized or otherwise contaminated, the number of acceptable welds obtainable between electrode dressing or replacement can be expected to decrease considerably. Consequently, much attention has heretofore been directed toward providing a cleaning of the work prior to welding.

One such effort is set forth in U.S. Pat. No. 3,278,720 to C. R. Dixon, the disclosure of which is herein incorporated by reference. In accordance with the teaching therein, the work is cleaned by an electric arc shielded by an inert gas. The arc is induced across desired points on the surface of the work and a cleaning head which is positioned in spaced proximity thereto. Welding is then effected in the conventional manner using structurally independent apparatus.

While the electrical cleaning of the work, as described above, has been determined to have a most beneficial result in terms of prolonging electrode life, it has now been discovered that this result can be even further enhanced by also providing an electrical cleaning of the electrodes. That this improvement should obtain is not wholly without explanation, however.

For example, it is reasoned with some logic that a contamination of the electrode working surfaces ought to be equally as disadvantageous as a contamination of the work. Insofar as the electrodes may become generally contaminated in the course of normal operations, it would therefore appear to be of benefit to provide for their cleaning as well.

A more specific way in which electrodes may become contaminated is by oxidation, which is believed to occur under certain conditions. To explain without wishing to become bound thereby, it is believed that such oxidation may be promoted by the phenomenon wherein material from the work becomes plated on, or even alloyed with, the material of the electrodes. It will be appreciated by those who have noticed that this phenomenon to some extent seems to persist regardless of whether the work has been cleaned. So it is theorized that where the work is particularly susceptible to oxidation, such as where it is of an aluminous material, on being sufficiently plated or alloyed the electrode working surfaces ought to become nearly of the same inclination.

Accordingly, it is one object of this invention to provide for an electrical cleaning of the electrodes as well as the work between successive welding operations.

It is another object of this invention to provide for an electrical cleaning of the electrodes as well as the work without the need for a cleaning head which is structurally separate and apart from the electrodes.

Still another object of this invention is to provide an improved apparatus and method particularly adapted for the resistance welding of aluminous materials.

Other objects, uses and advantages of this invention will become readily apparent from an understanding of the exemplary embodiments thereof as presented in the drawings, specification and claims.

SUMMARY OF THE INVENTION

This invention generally includes certain improved features in combination with conventional apparatus for joining two superimposed electrically conducting members by resistance welding, such apparatus being of the type having two opposed work-contacting electrodes, positioning means for respectively arranging the electrodes so as to grip the members to be joined therebetween, and circuit means for inducing an electric current across the electrodes and through the work so as to fuse the faying surfaces of the members at areas intermediate to the area of electrode contact.

Such improved features comprise additional positioning means for arranging the working surface of at least one, but preferably both, of the electrodes in spaced proximity to the corresponding area, or areas, of the work targeted for subsequent electrode contact so as to define a space between each such working surface so arranged and the corresponding targeted area, shielding means for filling each such space with an inert gas, and additional circuit means for either inducing an electric arc of alternating current or alternately inducing electric arcs of direct current across each such space so as to clean the associated electrode working surface and the corresponding targeted area of the work.

In accordance with the presently preferred embodiment of this invention, the above-mentioned additional circuit means comprises means for inducing an arc of low frequency alternating current impressed with high frequency alternating current as well as means for isolating the arc inducing circuitry thereof from the current inducing circuitry of the firstmentioned conventional circuit means.

The invention also includes a method of resistance welding wherein at least one, but preferably both, of the electrode working surfaces as well as the areas of the work targeted for subsequent electrode contact are electrically cleaned between successive welding operations conventionally performed. In accordance with the invention this electrical cleaning is carried out by arranging the desired electrode working surface in the appropriate spaced proximity to the corresponding targeted area of the work so as to define a space therebetween, filling the space with an inert gas, and either inducing an electric arc of alternating current or alternately inducing electric arcs of direct current across the space so as to clean both the electrode working surface and the corresponding targeted area of the work. Preferably the arc induced will be of low frequency alternating current impressed with high frequency alternating current and the means for inducing same will be isolated from the current inducing means required for welding at such times as either may be in operation.

Where the invention is practiced with respect to work made of an aluminous material, the inert gas of present preference for arc shielding purposes is argon. A mixture of helium and argon has also been found acceptable, especially where the two are respectively mixed by volume at a ratio of about 3 to 1.

DETAILED DESCRIPTION

As required, detailed embodiments of the invention are herein disclosed. However, it is to be understood that these embodiments are merely exemplary in many respects and therefore are not to be construed as limiting. For example, while an improved apparatus and method for spot welding are particularly shown and described, the invention is yet applicable to other forms of resistance welding as mentioned previously.

Figure 1:
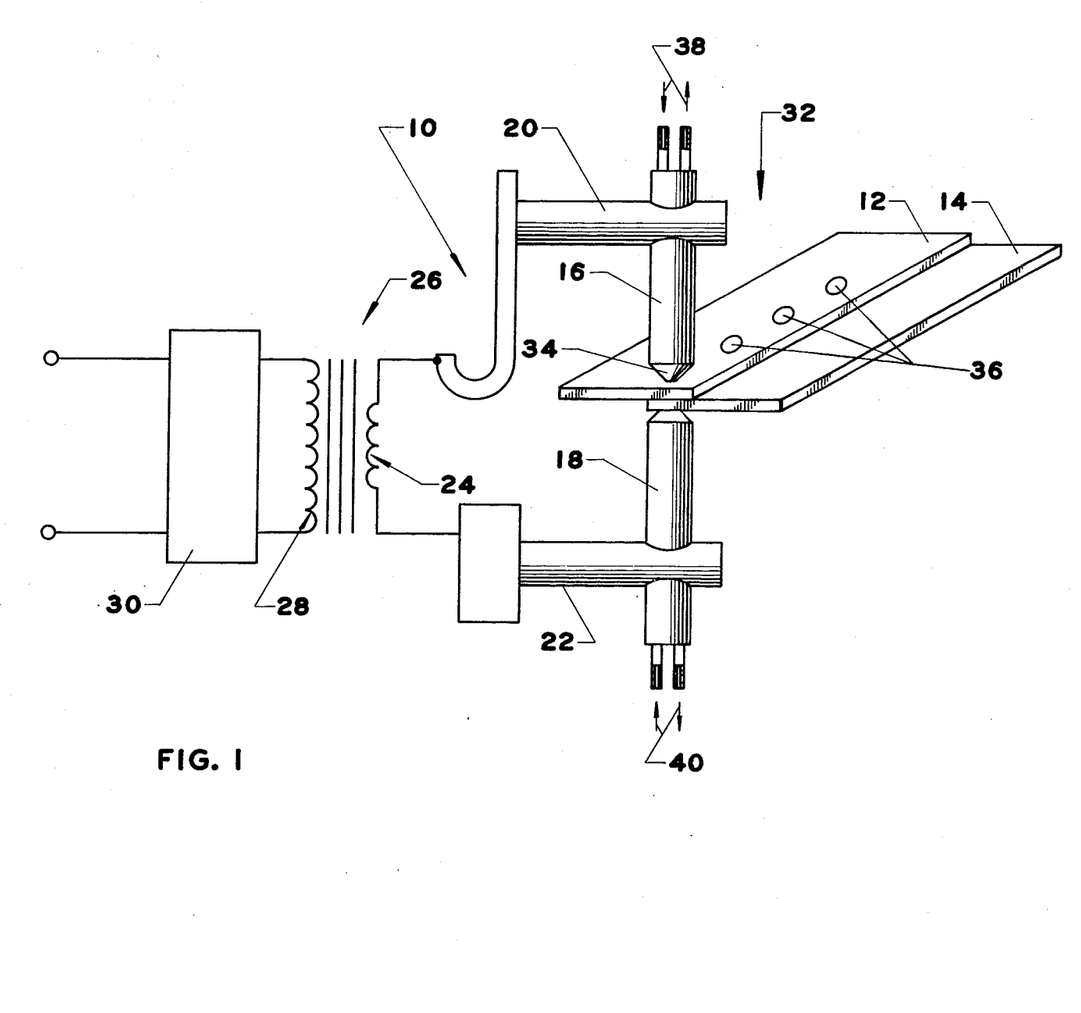
FIG. 1 is a schematic view illustrating a conventional embodiment of apparatus for spot welding.

Referring now to FIG. 1, there are schematically illustrated the basic components of a conventional spot welding machine 10 which may be used for joining superimposed electrically conducting members 12 and 14, which may, for example, be of an aluminous material. A pair of opposed work-contacting electrodes 16 and 18, typically of copper or a high melting point alloy thereof, are respectively supported by movable horn 20 and fixed horn 22 so as to be arranged on opposite sides of the members 12 and 14. The horns 20 and 22 are connected to the secondary wiring turns 24 of a transformer 26, the primary turns 28 of which are connected through a timer 30 to a source of alternating current.

In operation, the electrode 16 is carried downwardly by movable horn 20, as indicated by the arrow 32, whereby the working surfaces or tips 34 are respectively arranged in contact with outer opposed areas 36 (shown in connection with member 12 with respect to previous welds) of the associated opposite exposed surfaces of the members 12 and 14. Thereupon, the timer 30 supplies an appropriately phased input to the transformer 26 over a controlled period of time. The output of the transformer 26 in turn provides current across the electrodes 16 and 18 and through the members 12 and 14. As a result of the flow of current therethrough, the members 12 and 14 are locally heated whereby the superimposed faying surfaces thereof melt and fuse to become a weld at areas intermediate to the opposed areas 36. Means may be provided for supplying cooling water internally of the electrodes 16 and 18 as indicated by the arrows 38 and 40.

Figure 2:
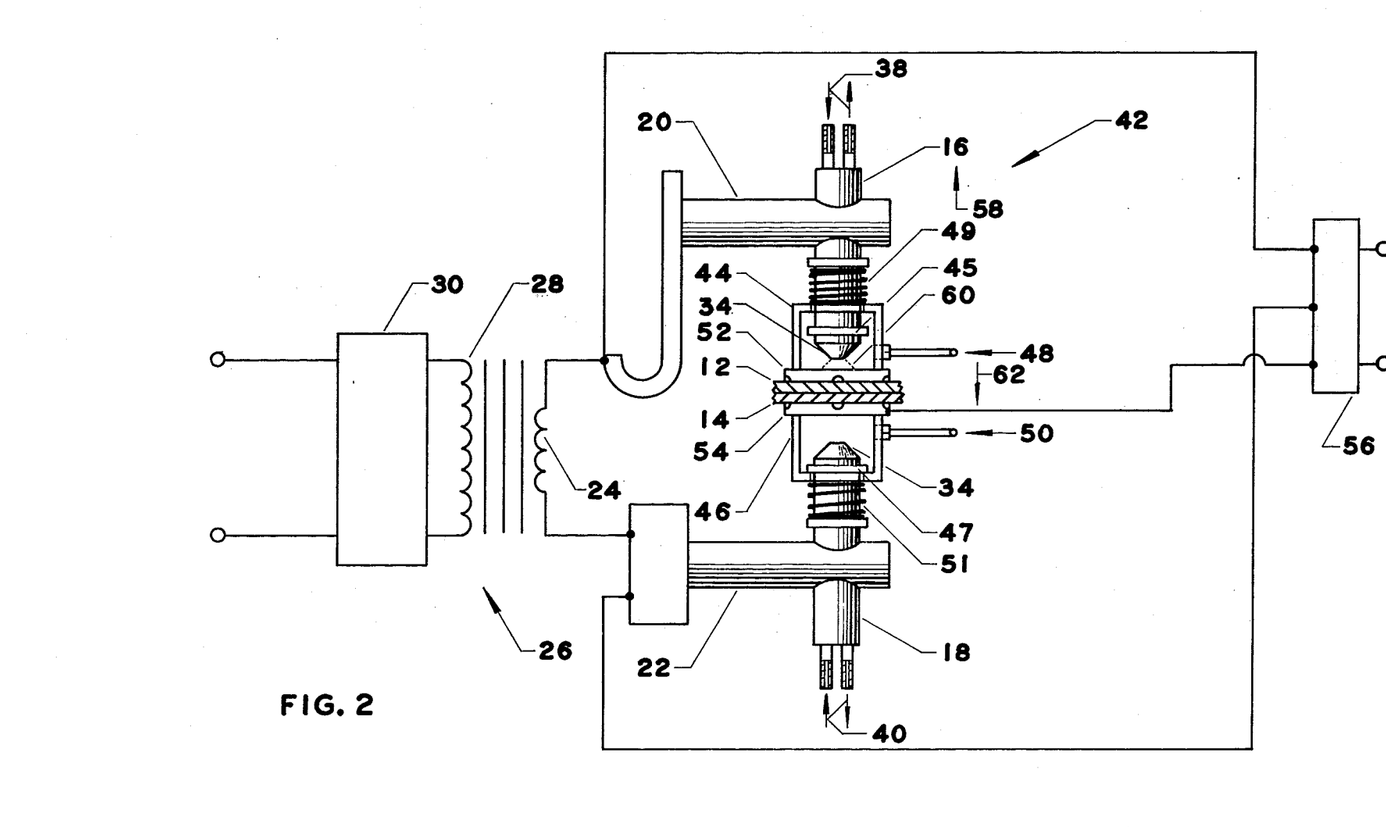
FIG. 2 is a schematic view illustrating an exemplary embodiment of the invention as adapted for spot welding.

In FIG. 2 there is shown by way of example an embodiment of the invention having utility for spot welding. To the extent that the embodiment has components equivalent to those illustrated in FIG. 1, corresponding reference numerals are carried over. Accordingly, the electrodes 16 and 18 of the improved spot welding machine 42 are provided with maovable coaxially mounted electrically non-conductive shielding cups 44 and 46. The electrodes 16 and 18 are also provided with coaxially mounted collars 45 and 47 which are in adjustably fixed position, and with coaxially mounted compressed springs 49 and 51 whose tendency is to force cups 44 and 46 respectively against collars 45 and 47. For exemplary purposes which will follow, spring 51 is more heavily loaded than spring 49. The cups 44 and 46, being constructed of transparent plastic for purposes of illustration, are connected to means for supplying an inert gas internally thereto, as indicated by arrows 48 and 50, and have electrically conducting contact rings 52 and 54. Further provided is circuit means 56, two terminals of which are respectively connected to horns 20 and 22, the two terminals becoming commonly connected when the circuit means 56 is activated, and a third terminal of which is commonly connected to contact rings 52 and 54.

Operation begins with movable horn 20 in its uppermost position, as indicated by the arrow 58, where the rings 52 and 54 are sufficiently spaced to permit the positioning of members 12 and 14 therebetween. With the appropriate location of members 12 and 14, movable horn 20 is partially lowered whereby members 12 and 14 are gripped between the rings 52 and 54 as shown. Spring 51 being under the heavier load, the tip 34 of electrode 16 is arranged in spaced proximity to the adjacent opposed area 36 of member 12 and the tip 34 of electrode 18 is substantially more spaced in comparison from the adjacent area 36 of member 14.

(Although not shown in FIG. 2, the term "opposed area 36" refers to the outer exposed area of the respective member 12 or member 14 which is situated directly opposite the work contacting tip 34 of the associated electrode 16 or electrode 18. See for example in FIG. 1 the opposed areas 36 shown in connection with related member 12 with respect to previous welds.) The inert gas is then supplied to the cups 44 and 46 and the circuit means 56 is activated, whereby an electric arc 60 is induced across the space between the tip 34 of electrode 16 and the opposed area 36 of member 12 and cleaning of same is effected. At this point, however, the resistance between the tip 34 of the electrode 18 and the opposed area 36 of member 14 is sufficiently excessive to permit the induction of an electric arc 60 thereacross. Therefore, the rings 52 and 54 are moved downwardly, as indicated by the arrow 62, cup 44 coming to rest against collar 45, whereby the tip 34 of electrode 18 is arranged in spaced proximity to the opposed area 36 of member 14. With the accompanying lowering of the resistance between the two, the tip 34 of electrode 18 and the opposed area 36 of member 14 are accordingly cleaned by the electric arc 60 thus induced. The cleaning operation being completed, the circuit means 56 and the supply of inert gas are deactivated, and movable horn 20 is fully lowered whereby the tips 34 of electrodes 16 and 18 are respectively arranged in contact with opposed areas 36 of members 12 and 14. The weld is then made following the activation of the timer 30 as described in connection with FIG. 1. Movable horn 20 is then shifted to its uppermost position so as to free the members 12 and 14.

While the improved spot welding machine 42 in FIG. 2 contemplates the alternate induction of electric arcs 60, being given the appropriate circuitry there is no reason why electric arcs 60 could not be simultaneously induced by respectively arranging the tips 34 of electrodes 16 and 18 in spaced proximity to the opposed areas 36 of members 12 and 14 at the same time. For example, a duality of circuit means 56 might be provided, each being connected to members 12 and 14 and respectively to electrodes 16 and 18.

Additionally, although the improved spot welding machine 42 of FIG. 2 requires a mechanical manipulation of electrodes 16 and 18 relative to members 12 and 14 to alternately induce electric arcs 60, the same result can also be achieved electrically. For example, the tips 34 of electrodes 16 and 18 could be respectively arranged in spaced proximity to the opposed areas 36 of members 12 and 14 at the same time and electrodes 16 and 18 could be alternately connected to one terminal of a two terminal circuit means 56 by a simple switch.

Furthermore, while it is presently preferred that electric arcs 60 will be induced prior to the making of each weld, substantial advantages may well attach where cleaning is performed less frequently.

And while the electric arcs 60 may in practice be induced in any known manner, it is presently preferred that circuit means 56 comprise an alternating current source. However, there appears to be no reason why suitable direct current circuitry could not be used instead. In this connection it will be appreciated that the substantial tendency of an electric arc 60 to provide a cleaning action is limited to that surface which is maintained at a relative negative potential. Thus, for example, to effect a respective cleaning of the tip 34 of electrode 16 and the opposed area 36 of member 12, it would be necessary to induce one electric arc 60 while maintaining the electrode 16 at a negative potential and a second electric arc 60 while maintaining the electrode 16 at a positive potential.

Regardless of the specific means selected for inducing electric arcs 60, it is suggested that steps be taken to prevent the same from inflicting damage to the welding circuitry and vice versa. Accordingly it is preferred that the two be electrically isolated from one another when either is in operation. Standard electrical contactors have been found ideally suited for this purpose.

Although any general type of alternating current source may be used to induce the electric arcs 60, proper selection should in part be based on dynamic and static volt-ampere characteristics designed for arc stability. For example, circuitry such as is routinely used for arc welding has proven most adaptable.

In accordance with the preferred embodiment of the invention, the electric arcs 60 are induced by standard arc welding circuitry of the type which includes a source of low frequency alternating current with a high frequency current impressed thereon. The more particular voltage and current requirements will, of course, vary with the characteristics of the work as well as those of the machine 42. Depending upon such characteristics, a 60 cycle base current, for example, might have an amperage in the range of 0.5 to 40; an acceptable high frequency component might be in the range of 50,000 to 3,000,000 cycles and be driven by a no-load voltage in the range of 2000 to 5000.

Figure 3:
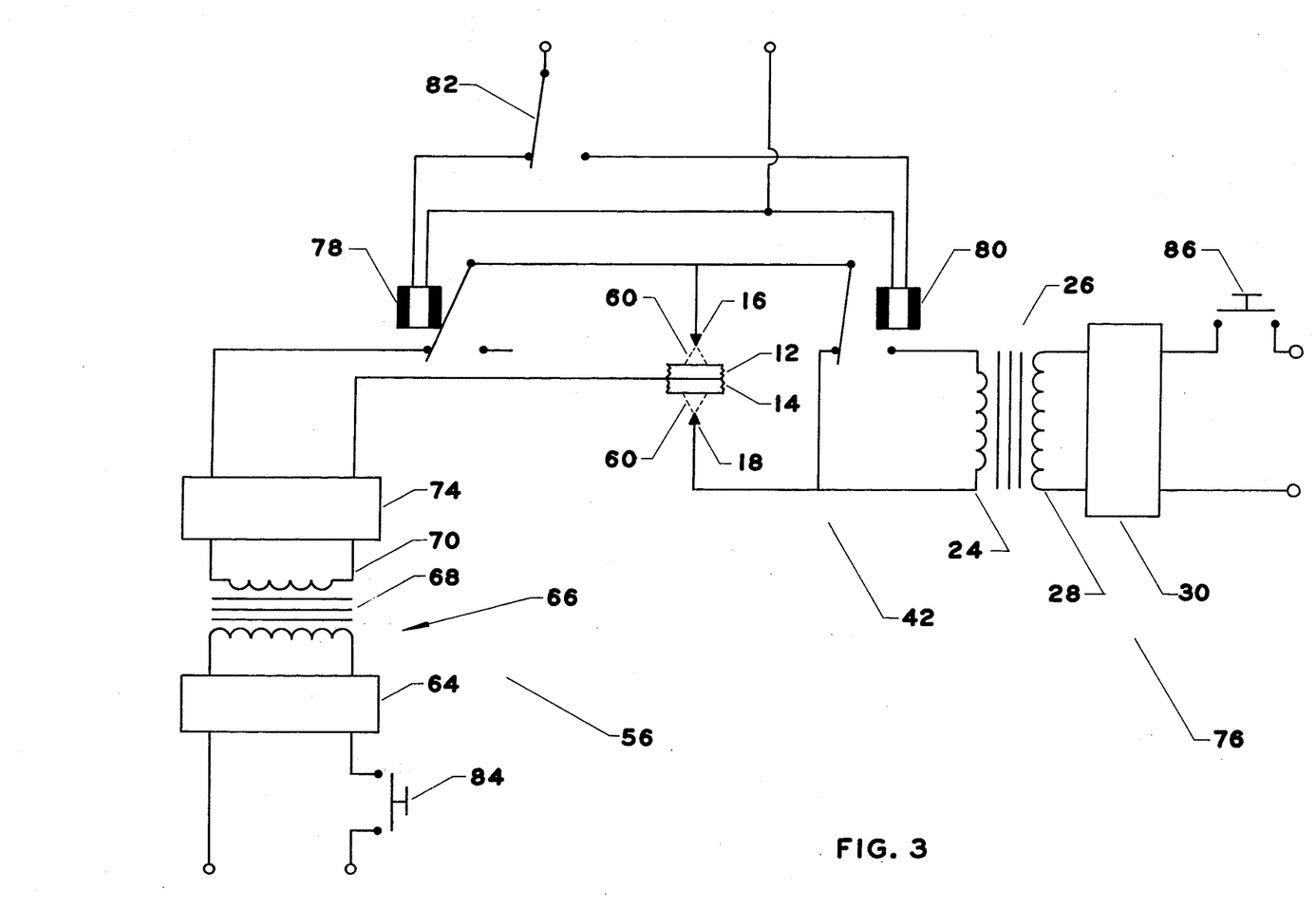
FIG. 3 is a circuit diagram illustrating an exemplary electrical system suitable for the operation of the apparatus of FIG. 2.

Reference is accordingly made to FIG. 3 which schematically illustrates suitable wiring of the improved spot welding machine 42 in further detail. Thus it can be seen that circuit means 56 may include an alternating current source connected through a timer 64 to the primary wiring turns 66 of a transformer 68. The secondary turns 70 of the transformer 68 are connected through a high frequency source 74 to electrodes 16 and 18 and members 12 and 14 as previously described with reference to FIG. 2. The circuit means 56 and the welding circuitry, generally denoted as circuit means 76, are isolated from one another by electrical contactors 78 and 80 as shown.

In operation, switch 82 is utilized to actuate contactors 78 and 80 so as to connect electrodes 16 and 18 to one side of circuit means 56 and to disconnect the same from circuit means 76. Each electrical arc 60 is then induced by actuating switch 84 subsequent to the respective arrangement of electrodes 16 and 18 relative to members 12 and 14 and the supply of inert gas therebetween as described in reference to FIG. 2. Essentially the switch 84 connects an alternating current source to timer 64 which permits an appropriately phased input to transformer 68 over a controlled period of time. The output of transformer 68 is thus directed to source 74 wherein it is impressed with a high frequency current for subsequent induction of an electric arc 60.

On completion of the cleaning operation, switch 82 is actuated to disconnect electrodes 16 and 18 from circuit means 56 and to respectively connect the same to the terminals of circuit means 76. The electrodes 16 and 18 being then respectively arranged in contact with members 12 and 14, welding is achieved as described in reference to FIG. 1 by activating switch 86 to connect an alternating current source to the timer 30.

For other and more particular details concerning the practice of this invention and the advantages thereof, reference is made to the following example.

EXAMPLE

In accordance with the experiment, successive spot welds were performed on pairs 0.032 inch 2036-T4 aluminum sheet where the electrodes as well as the work were cleaned prior to each weld. Oxide thickness on the sheet was measured at about 300–340 angstroms.

The basic welding apparatus, a Federal McKay Type PA-2-24/30 Press Welder, was wired for a cleaning capability by appropriately connecting the circuitry of a Hobart Cyber-TIG 300 Series Model No. CT-300 Arc Welding Power Source. Electrical isolation between the welding and cleaning circuits was effected by three conventional 300 amp contactors, one being positioned between the cleaning circuit and the electrodes, and two being positioned on opposite sides of the primary wiring turns of the welding transformer.

To provide inert gas shielding of the cleaning arcs, two spring loaded plastic cups were coaxially mounted on the electrode holders of the apparatus. Fitted on the cups were adjustable collars to set the spacing between the electrodes and the work during cleaning, and brass contact rings to complete the cleaning circuit. Spring tension was greatest on the lower cup so that initially when the sheets were gripped between the contact rings the upper electrode and sheet were in position for cleaning. Positioning of the lower electrode relative to the sheet for cleaning was effected by manually sliding the cups downwardly.

Prior to conducting the experiment the work and the electrodes were degreased in Chlorothene Nu and the electrode tips were dressed with No. 320 grit abrasive paper backed with a contoured paddle.

Welds were carried out at the rate of about 5-7 per minute using a single phase 480 volt 60Hz power supply to both the welding and cleaning circuits. For the particular parameters involved in the operation, reference is made to the following table:

| Variable | |
| --- | --- |
| Tip Force, Lb. | 800 |
| Current, kamp. | 25.1–27.6 |
| % Heat | 100 |
| Cycles Squeeze | 50 |
| Cycles Weld | 3 |
| Cycles Hold | 20 |
| Cycles Off | 10 |
| Electrode I.D. | Mallory 3825 |
| Electrode Class | II |
| Electrode Tip Radius, In. | 3 |
| Arc Current, amp. | 3.0 |
| Arc Time, Sec. | 1.6 |
| Shield Gas | 40 cfh argon |

The primary indicator of weld quality was nugget size as measured on peeling apart the sheets after welding.

Figure 4:
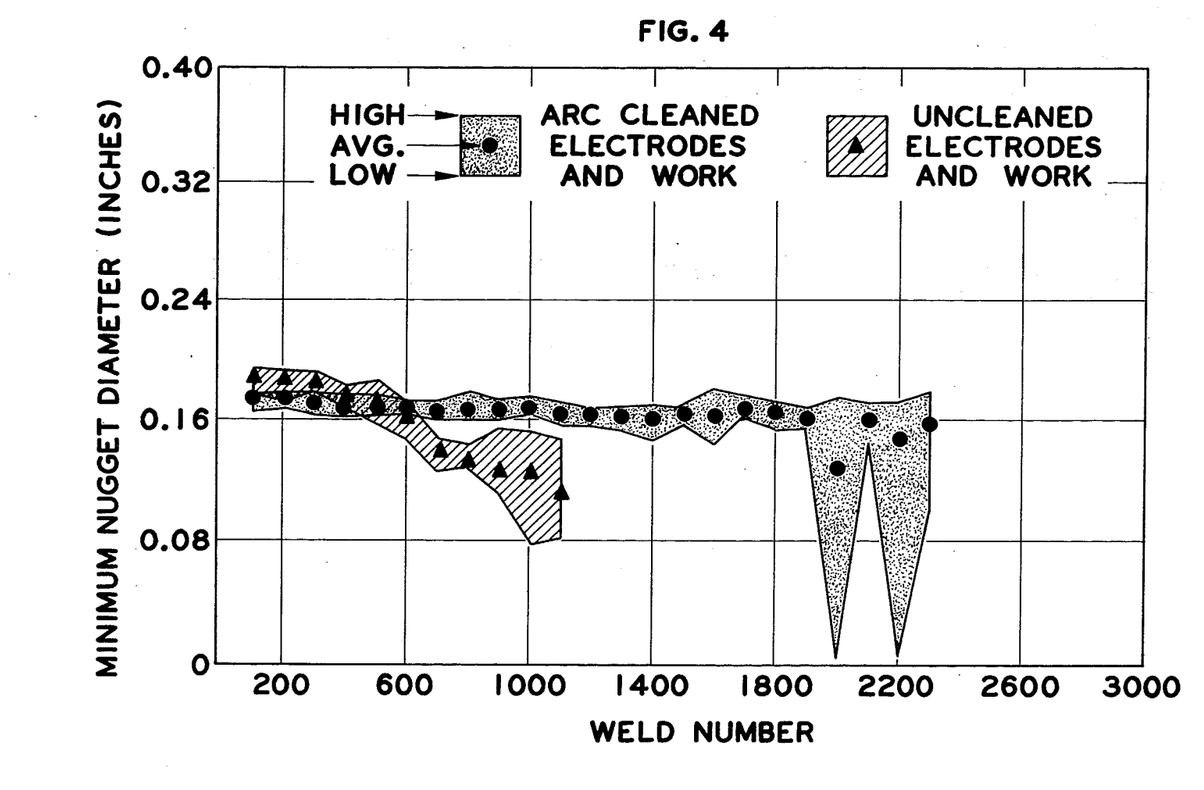
FIG. 4 is a graph relating weld quality, as measured by weld nugget peel diameter, to successive welds, wherein a spot welding operation in which there was no cleaning is compared with one performed in accordance with the invention.

The results are shown in FIG. 4 wherein nugget diameter is plotted against the number of prior completed welds. Thus it can be seen that about 1900 consistent welds were obtained using the invention. Moreover, the condition of the electrodes appeared to be relatively smooth even after 2300 welds.

As a control, a welding operation was carried out with the same equipment under substantially identical conditions except that neither the work nor the electrodes were cleaned, the results also appearing in FIG. 4. As can be seen, weld quality gradually decreased from the outset and became comparatively worse beginning at about 600 welds. Further, the electrodes were in visible need of repair after the 600 weld mark and were deteriorated considerably after about 1100 welds.

Figure 5:
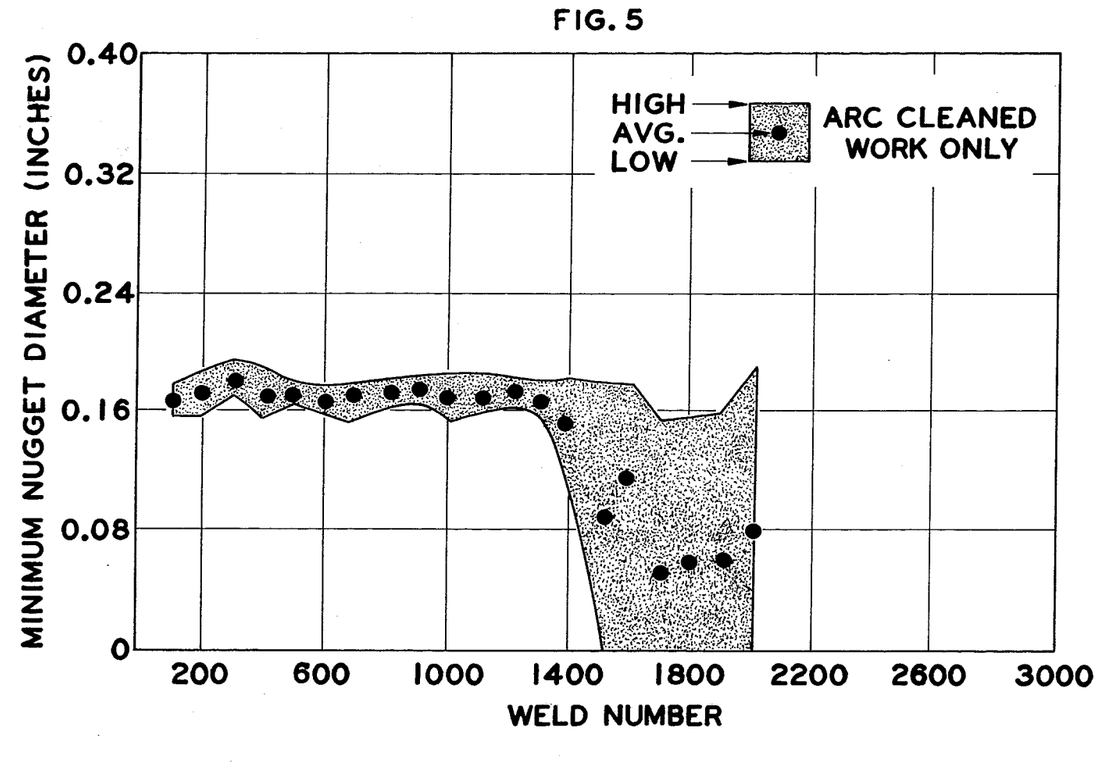
FIG. 5 is a graph relating weld quality to successive welds for a spot welding operation in which only the work was cleaned.

As a second control, the operation was again repeated except that cleaning was only provided for the work, separate electrodes being used for cleaning and welding purposes. The delay between each cleaning and the corresponding weld ranged from two to four hours. From the results, as shown in FIG. 5, it can be seen that only about 1300 consistent welds were obtained in comparison with the 1900 realized where the electrodes as well as the work were cleaned.

While various exemplary embodiments of the invention as well as methods of practicing the same have been illustrated and described it is to be understood that it may be still otherwise embodied and practiced within the scope of the following claims.

What is claimed is:

1. In resistance welding apparatus for joining two superimposed electrically conducting members, said apparatus being of the type having two opposed work-contacting electrodes, first positioning means for respectively arranging the working surfaces of said electrodes in contact with outer opposed areas of the respective opposite exposed surfaces of said members so as to grip said members between said electrodes, and first circuit means for inducing an electric current across said electrodes and through said members gripped therebetween so as to fuse the faying surfaces of said members at areas intermediate to said outer opposed areas, the improvement which comprises:
   a. second positioning means for arranging the working surface of one said electrode in spaced proximity to the associated said outer opposed area so as to define a space therebetween,
   b. arc shielding means for filling said space with an inert gas, and
   c. second circuit means, including means for inducing an electric arc across said space while maintaining said one electrode at a positive potential with respect to the associated said member so as to clean said associated outer opposed area, and means for inducing an electric arc across said space while maintaining said one electrode at a negative potential with respect to the associated said member so as to clean the working surface of said one electrode.

2. In a resistance welding apparatus for joining two superimposed electrically conducting members, said apparatus being of the type having two opposed work-contacting electrodes, first positioning means for respectively arranging the working surfaces of said electrodes in contact with outer opposed areas of the respective opposite exposed surfaces of said members so as to grip said members between said electrodes, and first circuit means for inducing an electric current across said electrodes and through said members gripped therebetween so as to fuse the faying surfaces of said members at areas intermediate to said outer opposed areas, the improvement which comprises:
   a. second positioning means for respectively arranging the working surfaces of said electrodes in spaced proximity to the associated said outer opposed areas so as to define a space between each said working surface and the associated said outer opposed area,
   b. arc shielding means for filling each said space with an inert gas, and
   c. second circuit means, including means for inducing an electric arc across each said space while maintaining the respective said electrode at a positive potential with respect to the associated said member so as to clean each said outer opposed area, and means for inducing an electric arc across each said space while maintaining the respective said electrode at a negative potential with respect to the associated said member so as to clean each said working surface.

3. The apparatus of claim 2 wherein said second circuit means comprises means for inducing an arc of alternating current.

4. The apparatus of claim 3 further comprising means for isolating said first circuit means from said second circuit means.

5. The apparatus of claim 2 wherein said second circuit means comprises means for inducing an arc of low frequency alternating current impressed with high frequency alternating current.

6. A method of joining two superimposed electrically conducting members by resistance welding wherein two opposed work-contacting electrodes are utilized, which comprises the steps of:
   a. arranging the working surface of one said electrode in spaced proximity to the exposed surface of the associated said member so as to define a space between the working surface of said one electrode and the adjacent area of said exposed surface, b. filling said space with an inert gas, c. inducing an electric arc across said space while maintaining said one electrode at a positive potential with respect to said associated member so as to clean said adjacent area, d. inducing an electric arc across said space while maintaining said one electrode at a negative potential with respect to said associated member so as to clean the working surface of said one electrode, e. arranging the working surface of said one electrode in contact with said adjacent area and the working surface of the other said electrode in contact with the exposed surface of the other said member at an opposed area substantially opposite to said adjacent area, whereby said members are gripped between said electrodes, and f. inducing an electric current across said electrodes and through said members gripped therebetween so as to fuse the faying surfaces of said members at areas intermediate to said adjacent area and said opposed area.

7. A method of joining two superimposed electrically conducting members by resistance welding wherein two opposed work-contacting electrodes are utilized, which comprises the steps of:

a. respectively arranging the working surfaces of said electrodes in spaced proximity to the opposite exposed surfaces of said members so as to define a space between each said working surface and the adjacent portion of the associated said exposed surface, b. filling each said space with an inert gas, c. inducing an electric arc across each said space while maintaining the respective said electrode at a positive potential with respect to the associated said member so as to clean each said adjacent portion, d. inducing an electric arc across each said space while maintaining the respective said electrode at a negative potential with respect to the associated said member so as to clean each said working surface, e. respectively arranging the working surfaces of said electrodes in contact with said adjacent portions, whereby said members are gripped between said electrodes, and f. inducing an electric current through said members gripped therebetween so as to fuse the faying surfaces of said members at areas intermediate to said adjacent portions.

8. The method of claim 7 wherein steps (c) and (d) are executed by inducing an arc of alternating current across each said space.

9. The method of claim 7 wherein steps (c) and (d) are executed by inducing an arc of low frequency alternating current impressed with high frequency alternating current across each said space.

10. The method of claim 7 wherein said members are of an aluminous material.

11. The method of claim 10 wherein the primary component of said inert gas is argon.

12. The method of claim 10 wherein said inert gas is essentially a mixture of helium and argon.

13. The method of claim 12 wherein the volumetric ratio of helium to argon is about 3 to 1.

* * * * *